No. 626,215. Patented June 6, 1899.
T. H. C. BEALL.
FIFTH WHEEL.
(Application filed Dec. 21, 1898.)
(No Model.)
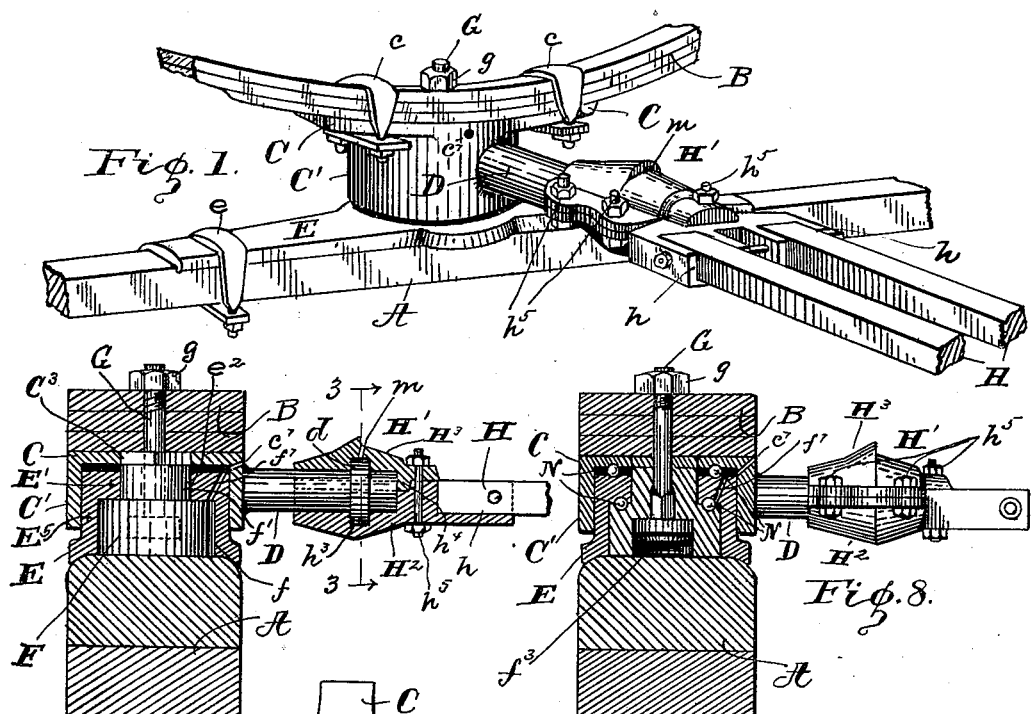
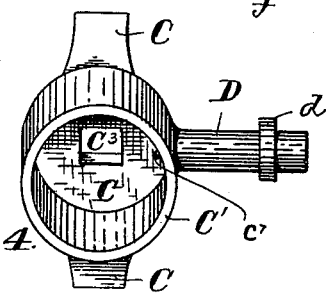
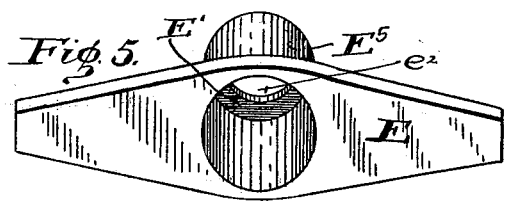
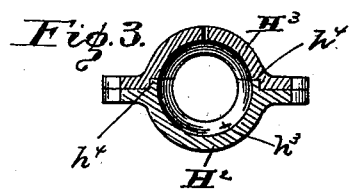
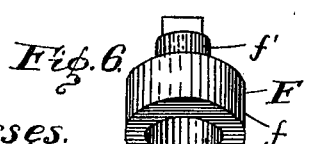
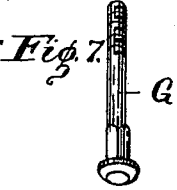
Witnesses.
Carl Schlegel.
L. A. Minturn.
Inventor,
Thomas H. C. Beall
By Joseph A. Minturn
Attorney.
THE NORRIS PETERS CO., PHOTO-LITHO., WASHINGTON, D. C.

UNITED STATES PATENT OFFICE.

THOMAS H. C. BEALL, OF CICERO, INDIANA.

FIFTH-WHEEL.

SPECIFICATION forming part of Letters Patent No. 626,215, dated June 6, 1899.

Application filed December 21, 1898. Serial No. 699,946. (No model.)

*To all whom it may concern:*

Be it known that I, THOMAS H. C. BEALL, a citizen of the United States, residing at Cicero, in the county of Hamilton and State of Indiana, have invented certain new and useful Improvements in Fifth-Wheels for Vehicles, of which the following is a specification.

This invention relates to improvements in that part of a vehicle which has commonly been known as the "fifth-wheel," although the term "coupling" would be a more proper designation of my construction, one of the objects of which is to dispense with the expanded "wheel" formation, which is not only expensive, but is unsightly in appearance and provides a surface upon which mud and dust accumulate.

The object of this invention is to provide a compact and neat-appearing coupling between the vehicle-springs and the front axle, such as will allow free horizontal movement of the front axle necessary in turning and guiding the vehicle, and to provide a construction in which the pulling strain is removed from the king-bolt and in which the swinging adjustment of the front axle will not in any way loosen the nut on the king-bolt.

The object, further, is to provide means whereby the bearing-surfaces may be lubricated and also to provide a coupling between the head-block of the vehicle and the reach which will permit of the necessary freedom of action of the front wheels in passing over uneven surfaces.

I accomplish the objects of the invention by the mechanism illustrated in the accompanying drawings, in which—

Figure 1 is a perspective view of my invention in working position, the view showing portions of the spring, the axle, and the reach of a vehicle. Fig. 2 is a vertical section on a plane transverse to the axle and through the king-bolt. Fig. 3 is a section on the dotted line 3 3 of Fig. 2. Figs. 4, 5, 6, and 7 are under side perspective views of the several parts of my fifth-wheel in relative but separated positions, and Fig. 8 is a vertical section of a modified construction of my invention.

A represents the axle of the vehicle, and B the springs, both of usual and well-known construction. The head-block to which the springs are fastened comprises a plate C, which has the under side flange or sleeve C', which is circular in cross-section. Through the plate C, central with the flange, is a square opening $C^3$, and integral with the walls of the flange C' is an arm D, which projects to the rear when the head-block is in place on the vehicle. This arm has a circumferential flange $d$. The reach of the vehicle will be connected with this arm in the manner as will be hereinafter described. The plate C will be fastened to the spring B by means of the clips $c$ in the usual manner.

E is what I designate as the "axle-plate" and which rests upon and is secured to the axle by means of the clips $e$. It has the integral turret $E^5$, which is hollow and cylindrical and makes a close revoluble fit between the walls of the flange C'. The covered top E' of the turret has a central opening $e^2$. This opening and the bore of the turret below the top or cover are circular and both are concentric.

F is a core or plug having the cylindrical portion $f$ to fill out the bore of the turret and a reduced cylindrical portion $f'$ to pass through the circular opening $e^2$. The upper end of the part $f'$ is squared to fit the square opening $C^3$ in the plate C. The shoulder left by squaring the end of the plug contacts with the plate C and limits the insertion of the plug into the plate. The length of the part $f'$ below the shoulder exceeds the thickness of the top E' of the turret, whereby the binding of the top of the turret between the plate C and the part $f$ of the plug is prevented. The plug F has a central opening $f^3$ for the introduction of the king-bolt G, the head of which is held inside of the plug and the threaded end projected through the usual openings through the springs and is retained by the nut $g$ on top of the springs.

Oil-holes $c^7$ and $f^7$ for the introduction of a lubricant are provided, as shown in the drawings.

H represents the reach of the vehicle, which, as shown in the drawings, is a double one, but which might be only a single one, this difference being common in vehicle construction.

H' is the reach-iron, preferably of malleable iron, with seats $h$ to receive the ends of the reaches, which are secured against removal by a bolt, as shown. Where a single reach is used, the middle seat will be utilized and the two outside seats will be left off. The front extension or continuation of the reach-iron forms a housing for the arm D. It is split longitudinally to form the bottom plate H² and the top or cover plate H³. The opening is extended longitudinally and centrally of a diameter to make a close fit around the arm D, and it is provided with the inside annular groove $h^3$ to receive the flange $d$ of the arm. By this construction a rotary movement of the arm D within the housing is obtained. A tongue-and-grooved joint $h^4$ is formed between the parts H² and H³ of the housing to exclude dust and dirt. The two parts are united by bolts $h^5$, as shown. An oil-hole $m$ is provided through the cover, and the metal in front of the opening outside is raised to form a dust-guard.

In the modification shown in Fig. 8 ball-bearings N are introduced on each side of the turret-cover to lessen the friction. In other respects the construction is the same as has been described.

Having thus fully described my invention, what I claim as new, and wish to secure by Letters Patent of the United States, is—

1. A head-block having an under side annular flange and an opening with straight sides, concentric with the flange, and also having an outside lateral extension to which the reach is coupled, an axle-plate having an upwardly-projecting turret or sleeve with an internal flange, a plug to fit the bore of the turret and having a reduced portion to extend through the top opening of the turret and the upper end of said plug being shaped to fit the square-sided opening through the head-block, through which it is projected, said plug having a longitudinal central opening, and a king-bolt to hold the parts together, substantially as described and specified.

2. A head-block with an under side annular flange and an opening concentric with the flange, said flange having a lateral extension to which the reach is fastened, an axle-plate having upwardly-projected cylindrical walls with an internal flange at the top, a plug to fill the bore of the axle-plate cylinder and reduced to pass through the opening at the top, said plug having its end reduced and shaped to fit the opening through the head-block said plug and opening through the head-block being shaped to compel the head-block and plug to move together, said plug having a longitudinal opening, means substantially as described, to keep the flange at the top of the axle-plate cylinder from being impinged between the head-block and the plug and a king-bolt to hold the several parts together, substantially as described.

3. An axle-plate having a top cylindrical flange or turret open at the bottom but partially closed at the top by an internal flange, a plug fitting into the cylindrical opening in the turret and having a reduced portion which is projected through the opening between the flange, the end of said reduced portion of the plug being squared at a suitable distance above the flange for the purposes specified, and said plug being provided with a central longitudinal opening, a head-block having an under side flange or sleeve to surround the flange or turret of the axle-plate and having a squared opening through which the reduced and squared end of the plug is inserted, said flange or turret having a laterally-extended arm with an annular flange near its end, a king-bolt, a split housing to fit over the end of the arm having a groove to form a seat for the flange of the arm, the meeting faces of the two parts of the housing being tongue-and-grooved to make dust-proof joint as shown and the housing having indented seats to receive the end or ends of the reach or reaches, substantially as described and specified.

In witness whereof I have hereunto set my hand and seal, at Indianapolis, Indiana, this 5th day of December, A. D. 1898.

THOMAS H. C. BEALL. [L. S.]

Witnesses:
JOSEPH A. MINTURN,
CARL SCHLEGEL.